United States Patent
Peana et al.

(10) Patent No.: US 9,971,436 B2
(45) Date of Patent: May 15, 2018

(54) TOUCH USER INTERFACE AT A DISPLAY EDGE

(71) Applicant: Dell Products L.P., Round Rock, TX (US)

(72) Inventors: Stefan Peana, Austin, TX (US); David Michael Meyers, Round Rock, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days. days.

(21) Appl. No.: 14/737,292

(22) Filed: Jun. 11, 2015

(65) Prior Publication Data

US 2016/0364030 A1  Dec. 15, 2016

(51) Int. Cl.
*G06F 3/045* (2006.01)
*G06F 3/041* (2006.01)

(52) U.S. Cl.
CPC .................. *G06F 3/0412* (2013.01)

(58) Field of Classification Search
CPC .. G06F 3/03547; G06F 3/0412; G06F 3/0416; G06F 3/0418; G06F 3/044; G06F 2203/0339; G06F 3/04104; G06F 3/04808
USPC ........................................................ 345/174
See application file for complete search history.

(56) References Cited

U.S. PATENT DOCUMENTS

| | | | |
|---|---|---|---|
| 2006/0197750 A1* | 9/2006 | Kerr | G06F 1/1626 345/173 |
| 2008/0309631 A1* | 12/2008 | Westerman | G06F 1/3203 345/173 |
| 2010/0321325 A1* | 12/2010 | Springer | G06F 3/041 345/173 |
| 2013/0135198 A1* | 5/2013 | Hodge | G06F 3/013 345/156 |
| 2014/0265821 A1* | 9/2014 | Malon | H05B 33/22 313/504 |
| 2014/0333858 A1* | 11/2014 | Martisauskas | G06F 1/1643 349/12 |
| 2015/0043142 A1* | 2/2015 | Jang | G06F 1/1652 361/679.26 |
| 2016/0034078 A1* | 2/2016 | Ryu | G06F 3/047 345/174 |
| 2016/0202786 A1* | 7/2016 | Lee | G09F 9/35 345/173 |

* cited by examiner

*Primary Examiner* — Kent Chang
*Assistant Examiner* — Mark Edwards
(74) *Attorney, Agent, or Firm* — Baker Botts L.L.P.

(57) ABSTRACT

A touch user interface may be implemented at a display edge, such as a display included with a portable information handling system. An edge touch element may provide structural support for the display along with touch functionality. The edge touch element may be integrated with a touch panel included with the display. The edge touch element may wrap around to a back face of the display.

17 Claims, 3 Drawing Sheets

TOUCH USER INTERFACE AT A DISPLAY EDGE

BACKGROUND

Field of the Disclosure

This disclosure relates generally to information handling systems and, more particularly, to a touch user interface at a display edge.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery.

Many information handling systems, including portable devices, are equipped with a touch panel that enables a touch user interface.

SUMMARY

In one aspect, an edge touch element is for portable information handling systems. The edge touch element may include a touch sensor layer bonded to a first edge of a display included in the portable information handling system. In the edge touch element, the first edge may be an external edge that is perpendicular to a display surface of the display. In the edge touch element, the touch sensor layer may include a plurality of touch pixels that are individually sensitive to touch input.

In any of the disclosed embodiments of the edge touch element, the display may include a touch panel layer that coincides with the display surface. In any of the disclosed embodiments of the edge touch element, the edge touch element may be electronically integrated with the touch panel layer. In any of the disclosed embodiments of the edge touch element, the touch sensor layer and the touch panel layer may have a common touch pixel coordinate axis. In any of the disclosed embodiments of the edge touch element, the touch sensor layer may extend to a back surface of the display opposite the display surface. In any of the disclosed embodiments of the edge touch element, the touch sensor layer may extend to a second edge of the display that is perpendicular to the display surface. In any of the disclosed embodiments of the edge touch element, the touch sensor layer may extend to a third edge of the display that is perpendicular to the display surface. In any of the disclosed embodiments of the edge touch element, the touch sensor layer may include portions having non-uniform touch pixel density. In any of the disclosed embodiments of the edge touch element, the touch sensor layer may include portions having different sensitivity to touch input. In any of the disclosed embodiments of the edge touch element, the touch sensor layer may include portions having different thicknesses.

In any of the disclosed embodiments, the edge touch element may further include a structural element including the touch sensor layer at the first edge. In the edge touch element, the structural element may hold together components comprising the display.

In any of the disclosed embodiments, the edge touch element may further include a conductive trace coupled to electronic components of the portable information handling system. In the edge touch element, the conductive trace may be electronically isolated from the touch sensor layer. In the edge touch element, the conductive trace may include an antenna for radio frequencies.

Other disclosed aspects include an information handling system comprising the edge touch element and a display.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2A, 2B, 3, and 4 wherein like numbers are used to indicate like and corresponding parts.

Figure 1:
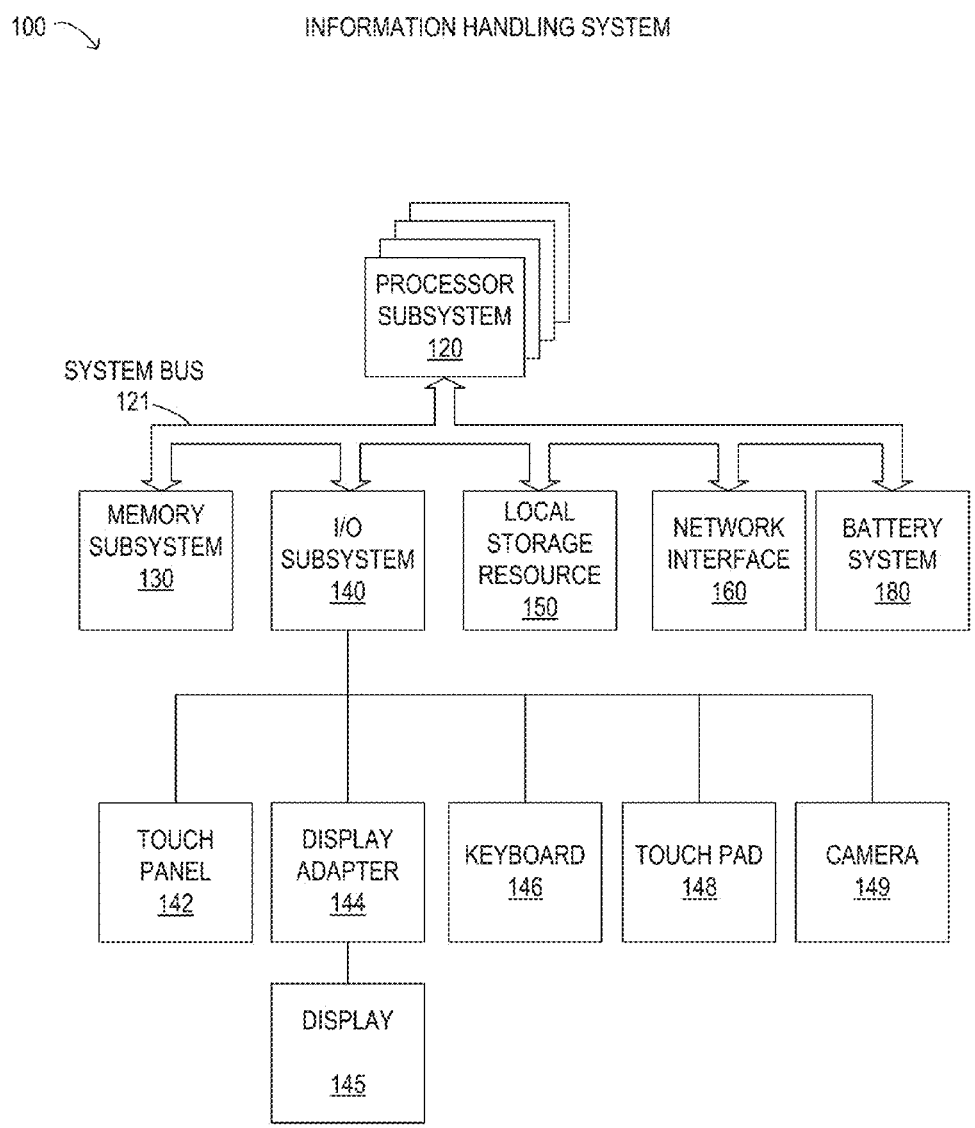
FIG. 1 is a block diagram of selected elements of an embodiment of an information handling system.

Turning now to the drawings, FIG. 1 illustrates a block diagram depicting selected elements of an embodiment of information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or another component of physical hardware 102). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, touch pad 148, and camera 149. Touch panel 142 may include circuitry for enabling touch functionality in conjunction with display 145 that is driven by display adapter 144. Camera 149 may represent any of a variety of imaging devices, such as a video camera, infrared camera, or combinations thereof.

In various embodiments of information handling system 100, such as portable devices or so-called all-in-one devices, display 145 may be mechanically integrated to other components. Furthermore, touch panel 142 may be integrated into display 145 such that a touch user interface is provided to a user. The touch user interface typically coincides with a pixel space of display 145 such that touch inputs correspond to certain display pixels, which may present user interface elements, such as buttons, menus, input fields, etc., to the user. As display 145 and touch panel 142 become more lightweight and thinner, the display portion may extend nearly to the edge of display 145 and may be implemented with a very small or no border.

As will be described in further detail herein, an edge touch element may be provided with display 145. For example, when information handling system 100 is a laptop-style device, display 145 may be hingeably attached to a body that includes a keyboard and may include touch panel 142. In some embodiments, an edge touch element may be provided along any of the three exposed edges of display 145 of a laptop-style device. The edge touch element may be in addition to touch panel 142 and may provide additional opportunities for receiving touch user input from the user. The edge touch element may be functionally integrated into the pixel space provided by touch panel 142. The edge touch element may further provide mechanical stability for holding various components of display 145 together.

Figure 2A:
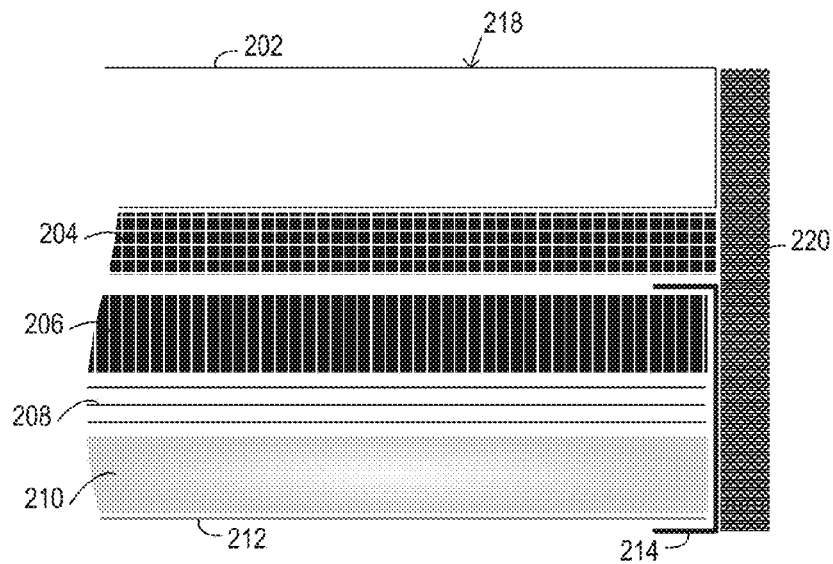
FIGS. 2A and 2B are block diagrams of selected elements of embodiments of display stacks with an edge touch element.

Referring now to FIG. 2A, selected elements of an embodiment of framed display stack 200 in an information handling system are illustrated. FIG. 2A is a schematic illustration and is not drawn to scale. As shown, framed display stack 200 illustrates various layered elements included in a thin display device having touch functionality, such as in a portable information handling system, along with edge touch element 220.

In framed display stack 200, cover glass 202 may be an external cover layer that is optically transparent. Accordingly, display surface 218 is an output display surface of framed display stack 200 that faces a user. Cover glass 202 may be bonded to, or may be in contact with, touch panel layer 204, which may represent an array of sensors that are sensitive to touch inputs on cover glass 202 received from a user. For example, touch panel layer 204 may be a capacitive touch sensor and may be correspondingly connected to electronics for driving and sensing touch operation, which are not shown in FIG. 2A. As shown in FIG. 2A, cover glass 202 and touch panel layer 204 may be bonded to frame 214 which provides mechanical support for display components that frame 214 surrounds. As shown, frame 214 surrounds liquid crystal display (LCD) cell 206, films 208, light guide 210, and reflector 212. In various embodiments, framed display stack 200 may further be enclosed in at least one external plastic housing or cover, which is omitted for descriptive clarity in FIG. 2A. LCD cell 206 may be an open cell that allows light to be transmitted from light guide 210 towards cover glass 202 to produce a display image. Films 208 may provide various levels of color and light filtering for a desired display image. Reflector 212 may be reflect backlight towards LCD cell 206 to improve illumination. A light source, such as an array of light-emitting diodes (LED) may be positioned at an edge of light guide 210 and is omitted for descriptive clarity from FIG. 2A.

As shown in FIG. 2A, edge touch element 220 may be attached at an outer edge of framed display stack 200. Edge touch element 220 may be comprised of a polymer or plastic material that includes touch sensors, such as a capacitive touch sensor layer. The polymer or plastic portion may be sized to various thickness. The thickness of edge touch element 220 may be dimensioned for a desired degree of structural support. The thickness or composition of edge touch element 220 may be selected for a desired aesthetic quality, such as suitability for touch input. In some embodiments, edge touch element 220 may be externally exposed for user input. In other embodiments, edge touch element 220 may be installed behind an external panel or covering that enables touch operation. A shape or extent of edge touch element 220 may be selected based on desired mechanical properties and method of installation in the information handling system. For example, edge touch element 220 may extend along one, two, or three edges of the display. Edge touch element 220 may be bonded in framed display stack 200 using various methods, such as using adhesives, thermal processes, welding, or mechanical attachment, or combinations thereof. In some embodiments, edge touch element 220 is bonded to frame 214.

As shown in FIG. 2A, edge touch element 220 is a separate touch element from touch panel layer 204. In some embodiments, edge touch element 220 may include an extension of touch panel layer 204 and may share electrical connections and sensor drive circuitry with touch panel layer 204. Although shown covering a side face of framed display stack 200 in FIG. 2A, edge touch element 220 may include portions that extend to other faces of the display, such as display surface 218 or an opposing surface to display surface 218 (see also FIGS. 2B and 3). Furthermore, a touch pixel density or touch pixel array included with edge touch element 220 may be selected based on various criteria. In certain embodiments, the touch pixel arrangement of edge touch element 220 corresponds to a touch pixel density of touch panel layer 204. In some embodiments, the touch pixel arrangement of edge touch element 220 may have a lower or a higher touch pixel density than touch panel layer 204. In various embodiments, edge touch element 220 may have a non-uniform touch pixel density.

In operation, edge touch element 220 may be enabled to receive touch input from a user and to register touch events from the touch input. The touch input from edge touch element 220 may be received and recognized by the information handling system as being distinct from touch input to touch panel layer 204. Because edge touch element 220 provides an additional, external touch user interface to touch panel layer 204, various types of touch functionality may be provided to the user using edge touch element 220. For example, a three-dimensional (3D) touch interface may be realized using edge touch element 220. Certain shortcuts or button functionality may be assigned to edge touch element 220, or to individual portions of edge touch element 220. For example, certain buttons or touch fields may be shown to the user at an edge of LCD cell 206 adjacent to edge touch element 220 to signify functionality accessible by touching corresponding portions of edge touch element 220. Additionally, edge touch element 220 may include electronic connections, such as connecting traces to connect components within the portable information handling system (see also FIG. 3). In some embodiments, edge touch element 220 may include certain electronic components, such as an antenna structure for wireless networking in the radio frequency (RF) spectrum.

Figure 2B:
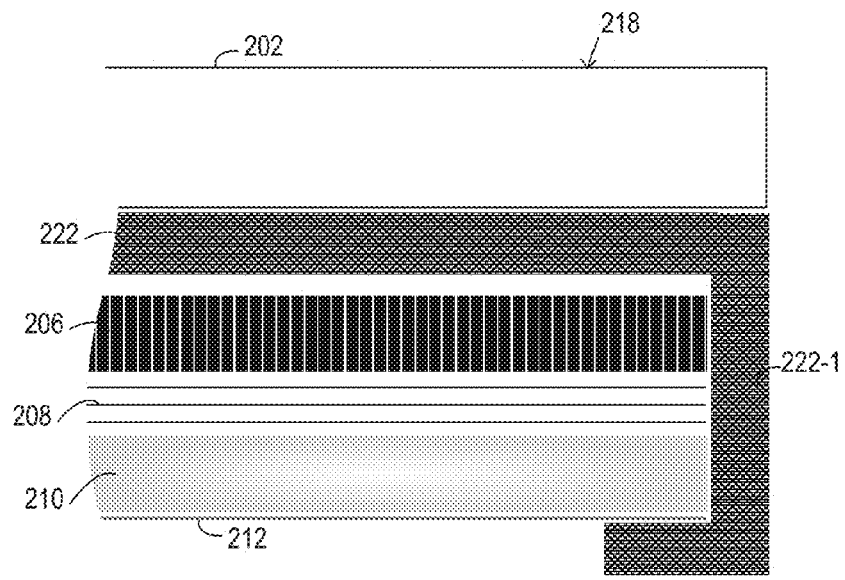

Referring now to FIG. 2B, selected elements of an embodiment of unframed display stack 201 in an information handling system are illustrated. FIG. 2B is a schematic illustration and is not drawn to scale. As shown, unframed display stack 201 illustrates various layered elements included in a thin display device having touch functionality, such as in a portable information handling system, along with touch element 222 that includes an edge touch portion 222-1. Touch element 222 may provide similar functionality as edge touch element 220 described in FIG. 2A.

As shown in FIG. 2B, in unframed display stack 201, cover glass 202 may be an external cover layer that is optically transparent. Accordingly, display surface 218 is an output display surface of unframed display stack 201 that faces a user. Cover glass 202 may be bonded to, or may be in contact with, touch element 222, which may include an array of sensors that are sensitive to touch inputs on cover glass 202 received from a user. For example, touch element 222 may include a capacitive touch sensor and may be correspondingly connected to electronics for driving and sensing touch operation, which are not shown in FIG. 2B. Thus, cover glass 202 may be bonded to touch element 222, which provides mechanical support for display components that touch element 222 surrounds. In some embodiments, at least a portion of touch element 222 may be formed as a unitary structure with cover glass 202. For example, touch element 222 may use cover glass 202 as a substrate for forming electrical connections and components, such as capacitive touch sensors that are responsive to touch inputs on cover glass 202.

As shown in FIG. 2B, touch element 222 surrounds liquid crystal display (LCD) cell 206, films 208, light guide 210, and reflector 212. In various embodiments, unframed display stack 201 may further be enclosed in at least one external plastic housing or cover, which is omitted for descriptive clarity in FIG. 2B. LCD cell 206 may be an open cell that allows light to be transmitted from light guide 210 towards cover glass 202 to produce a display image. Films 208 may provide various levels of color and light filtering for a desired display image. Reflector 212 may be reflect backlight towards LCD cell 206 to improve illumination. A light source, such as an array of light-emitting diodes (LED) may be positioned at an edge of light guide 210 and is omitted for descriptive clarity from FIG. 2B.

As shown in FIG. 2B, touch element 222 provides touch functionality associated with unframed display stack 201 and may extend to an outer edge of unframed display stack 201, shown as edge touch portion 222-1. In some embodiments, edge touch portion 222-1, while having a common touch sensor layer with touch element 222, may be dimensioned to provide structural support to unframed display stack 201, such as by having a larger thickness or including a different substrate material. Accordingly, edge touch portion 222-1 may be comprised of a polymer or plastic material that includes touch sensors, such as a capacitive touch sensor layer. The polymer or plastic portion may be sized to various thickness. The thickness of edge touch portion 222-1 may be dimensioned for a desired degree of structural support. The thickness or composition of edge touch portion 222-1 may be selected for a desired aesthetic quality, such as suitability for touch input.

In some embodiments, edge touch portion 222-1 may be externally exposed for user input. Additionally, a thickness of edge touch portion 222, or certain parts thereof, may be varied for desired properties. For example, at the corners, edge touch portion 222 may be formed to be thinner for ease of bending to a final desired shape. The thinner corner may include a thinner touch layer, a thinner substrate material, or a combination thereof.

In other embodiments, edge touch portion 222-1 may be installed behind an external panel or covering that enables touch operation. A shape or extent of edge touch portion 222-1 may be selected based on desired mechanical properties and method of installation in the information handling system. For example, edge touch portion 222-1 may extend along one, two, or three edges of the display. Edge touch portion 222-1 may be bonded in unframed display stack 201 using various methods, such as using adhesives, thermal processes, welding, or mechanical attachment, or combinations thereof.

Accordingly, in some embodiments, edge touch portion 222 may be used as a packaging element for unframed display stack 201 that serves to hold the various elements of in the display together structurally, as well as provide touch functionality. For example, edge touch portion 222 may be formed as a structural element, such as a thickened layer of polymer material, that includes touch sensors and corresponding electrical connections. The structural function of edge touch portion 222 in this case may correspond to the structural function provided by frame 214 in FIG. 2A. In some embodiments, edge touch portion 222 includes an embedded structural material, such as a metal strip, for rigidity and structural support.

In FIG. 2B, edge touch portion 222-1 is shown extending from display surface 218 to an edge of unframed display stack 201 at edge touch portion 222-1, and further extending to a backside unframed display stack 201 that is opposite of display surface 218. Furthermore, a touch pixel density of edge touch portion 222-1 may be selected based on various criteria. In certain embodiments, the touch pixel arrangement of edge touch portion 222-1 corresponds to a touch pixel density of other portions of touch element 222. In some embodiments, the touch pixel arrangement of edge touch portion 222-1 may have a lower or a higher touch pixel density than other portions of touch element 222. In various embodiments, edge touch portion 222-1 may have a non-uniform touch pixel density.

In operation, edge touch portion 222-1 may be enabled to receive touch input from a user and to register touch events from the touch input. The touch input from edge touch portion 222-1 may be received and recognized by the information handling system as being distinct from touch input to other portions of touch element 222 that coincide with a display area shown at display surface 218. Because edge touch portion 222-1 provides an additional, external touch user interface to other portions of touch element 222, various types of touch functionality may be provided to the user using edge touch portion 222-1. For example, a three-dimensional (3D) touch interface may be realized using edge touch portion 222-1. Certain shortcuts or button functionality may be assigned to edge touch portion 222-1, or to individual portions of edge touch portion 222-1. For example, certain buttons or touch fields may be shown to the user at an edge of LCD cell 206 adjacent to edge touch portion 222-1 to signify functionality accessible by touching corresponding portions of edge touch portion 222-1.

Figure 3:
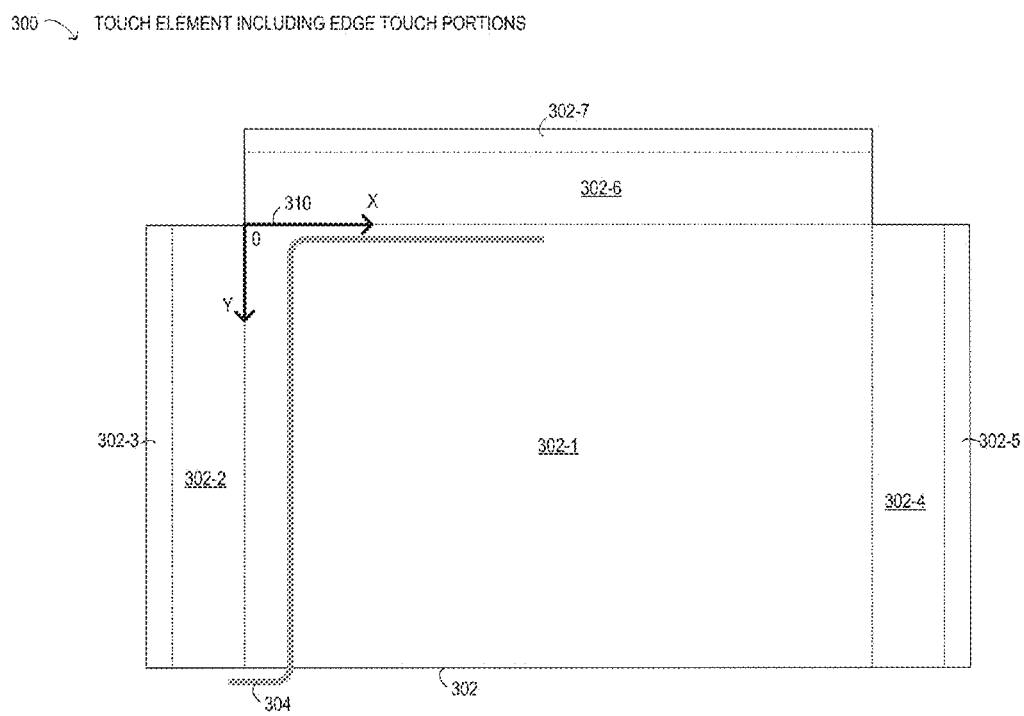
FIG. 3 is a block diagram of selected elements of an embodiment of a touch element including display edge portions.

Referring now to FIG. 3, selected elements of an embodiment of touch element 300 in an information handling system are illustrated. FIG. 3 is a schematic illustration and is not drawn to scale. As shown, touch element 300 may represent an embodiment of touch element 222 shown in FIG. 2B.

In FIG. 3, touch element 300 is shown including various portions. A display portion 302-1 corresponds to a display area of a display. Display portion 302-1 may be aligned with a touch pixel coordinate axis 310, shown having an origin at a top left corner, and having an X axis and a Y axis. The touch pixel coordinate axis 310 may be correlated with display pixel coordinates of the display (not shown) to provide integrated touch functionality to a user with a graphical user interface, for example. The touch pixel coordinate axis 310 may have a certain touch pixel density that may be different from a display pixel density of the display.

Also shown in FIG. 3 are edge touch portions 302-2, 302-4, 302-6, which extend display portion 302-1 to three edges of the display. It is noted that touch element 300 may be implemented with any one, two, or three of edge touch portions 302-2, 302-4, 302-6. In FIG. 3, edge touch portions 302-2, 302-4, 302-6 are shown in a planar arrangement to illustrate how touch pixel coordinate axis 310 may be extended to edge touch portions 302-2, 302-4, 302-6. The dashed lines in touch element 300 illustrate edges where edge touch portions 302-2, 302-4, 302-6 may be bent perpendicularly to extend to side edges of the display. Also shown are back touch portions 302-3, 302-5, 302-7 where touch element 300 extend to a back surface opposite display portion 302-1. Although touch pixel coordinate axis 310 is shown having an origin at a top left corner of display portion 302-1, other locations for the origin may be used in different embodiments. It is noted that negative coordinates may be used with touch pixel coordinate axis 310.

In various embodiments of touch element 300, different types of patterns for the touch pixels may be used. For example, touch portion 302-1 may have a higher touch pixel density than other portions of touch element 300. Certain portions of touch element 300 may have gaps where no touch pixels are present, such as at folding portions of touch element 300, for example between touch portion 302-1 and edge touch portions 302-2, or between edge touch portion 302-2 and back touch portion 302-3. Certain portions of touch element, particularly edge touch portions 302-2, 302-4, 302-6 and back touch portions 302-3, 302-5, 302-7 may have a reduced touch pixel density, or may have a relatively small number of touch sensors in defined regions. Additionally, a touch sensitivity of edge touch portions 302-2, 302-4, 302-6 and back touch portions 302-3, 302-5, 302-7 may be varied to be more or less sensitive to touch input.

Also shown schematically in FIG. 3 are conductive traces 304. Because touch element 300 is a conductive element that extends over a surface of a display in a portable information handling system, conductive traces 304 may be used to connect certain electronic components that are housed in the display. Thus, conductive traces 304 may supplant wiring and connectors that would otherwise need to be routed within a display stack and may aid in maintaining a compact construction of the display with fewer components for assembly. As shown, conductive traces 304 may provide connections within a separate layer of touch element 300, for example from a hinged end of the display that connects to the portable information handling system to various parts of the display. Thus, conductive traces 304 may be electronically isolated from a touch sensor layer (or layers) included with touch element 300. In this manner connections for electrical components such as antennas and cameras, which may be included in a display portion of a portable information handling system, may be provided using touch element 300. It is noted that conductive traces 304, as illustrated, are exemplary and may be patterned in various shapes and arrangements. In certain embodiments, electronic components, such as an antenna, may be formed within touch element 300 using conductive traces 304.

In operation, a user may touch touch element 300 and generate a touch event. The coordinates of touch events corresponding to display portion 302-1 may be processed as conventional touch events, comparable to using a computer mouse with the information handling system. The coordinates of touch events corresponding to edge touch portions 302-2, 302-4, 302-6 and back touch portions 302-3, 302-5, 302-7 may be associated with additional functionality, such as 3D functionality, among others It is noted that multiple finger touch and finger motion may also be detected.

As disclosed herein, a touch user interface may be implemented at a display edge, such as a display included with a portable information handling system. An edge touch element may provide structural support for the display along with touch functionality. The edge touch element may be integrated with a touch panel included with the display. The edge touch element may wrap around to a back face of the display.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A display for portable information handling systems, comprising:
   a cover glass including a display surface and a first external edge that is perpendicular to the display surface;
   a touch sensor layer bonded to the first external edge of the cover glass, the touch sensor layer including a plurality of touch pixels that are individually sensitive to touch input;
   a structural element including the touch sensor layer at the first external edge that holds together display components of the display, the display components including a light guide and a mirror; and
   a touch panel layer disposed under the display surface and adjacent to at least a portion of the touch sensor layer,
   wherein the touch sensor layer and the touch panel layer have a common touch pixel coordinate axis that is aligned with display pixel coordinates of the display.

2. The display of claim 1, wherein the edge touch element is electronically integrated with the touch panel layer.

3. The display of claim 1, wherein the touch sensor layer extends to a back surface of the display opposite the display surface.

4. The display of claim 1, wherein the touch sensor layer extends to a second edge of the display that is perpendicular to the display surface.

5. The display of claim 4, wherein the touch sensor layer extends to a third edge of the display that is perpendicular to the display surface.

6. The display of claim 1, wherein the touch sensor layer includes portions having non-uniform touch pixel density.

7. The display of claim 1, wherein the touch sensor layer includes portions having different sensitivity to touch input.

8. The display of claim 1, wherein the touch sensor layer includes portions having different thicknesses.

9. An information handling system comprising:
   a display comprising:
      a cover glass including a display surface and a first external edge that is perpendicular to the display surface;
      an edge touch element bonded to the first external edge of the cover glass, the edge touch element further comprising a touch sensor layer including a plurality of touch pixels that are individually sensitive to touch input;
      a structural element including the touch sensor layer at the first external edge that holds together display components of the display, the display components including a light guide and a mirror; and
      a touch panel layer disposed under the display surface and adjacent to at least a portion of the touch sensor layer,
   wherein the touch sensor layer and the touch panel layer have a common touch pixel coordinate axis that is aligned with display pixel coordinates of the display.

10. The information handling system of claim 9, wherein the touch sensor layer extends to a back surface of the display opposite the display surface.

11. The information handling system of claim 9, wherein the touch sensor layer extends to a second edge of the display that is perpendicular to the display surface.

12. The information handling system of claim 9, wherein the touch sensor layer extends to a third edge of the display that is perpendicular to the display surface.

13. The information handling system of claim 9, wherein the touch sensor layer includes portions having non-uniform touch pixel density.

14. The information handling system of claim 9, wherein the touch sensor layer includes portions having different sensitivity to touch input.

15. The information handling system of claim 9, wherein the touch sensor layer includes portions having different thicknesses.

16. The information handling system of claim 9, wherein the edge touch element further comprises:
    a conductive trace coupled to electronic components of the information handling system, wherein the conductive trace is electronically isolated from the touch sensor layer.

17. The information handling system of claim 16, wherein the conductive trace includes an antenna for radio frequencies.

\* \* \* \* \*